United States Patent
Madraswala et al.

(10) Patent No.: US 12,360,669 B2
(45) Date of Patent: Jul. 15, 2025

(54) METHOD AND APPARATUS TO REDUCE MEMORY IN A NAND FLASH DEVICE TO STORE PAGE RELATED INFORMATION

(71) Applicant: Intel NDTM US LLC, Santa Clara, CA (US)

(72) Inventors: Aliasgar S. Madraswala, Folsom, CA (US); Shanmathi Mookiah, Santa Clara, CA (US); Pratyush Chandrapati, Folsom, CA (US); Naveen Prabhu Vittal Prabhu, Folsom, CA (US)

(73) Assignee: Intel NDTM US LLC, Santa Clara, CA (US)

( * ) Notice: Subject to any disclaimer, the term of this patent is extended or adjusted under 35 U.S.C. 154(b) by 0 days.

(21) Appl. No.: 18/107,677

(22) Filed: Feb. 9, 2023

(65) Prior Publication Data
US 2023/0185453 A1  Jun. 15, 2023

(51) Int. Cl.
*G06F 3/06* (2006.01)

(52) U.S. Cl.
CPC .......... *G06F 3/0608* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| 9,659,638 | B1 | 5/2017 | Shin | |
|---|---|---|---|---|
| 2013/0132638 | A1 | 5/2013 | Horn et al. | |
| 2014/0244909 | A1* | 8/2014 | Shirakawa | G06F 12/0246 711/103 |
| 2017/0024127 | A1* | 1/2017 | Bazarsky | G06F 3/0659 |
| 2017/0255502 | A1 | 9/2017 | Fujinami et al. | |
| 2017/0371559 | A1 | 12/2017 | Higgins et al. | |
| 2021/0065813 | A1 | 3/2021 | Papandreou et al. | |
| 2023/0185453 | A1 | 6/2023 | Madraswala et al. | |

OTHER PUBLICATIONS

Parnell, et al., "NAND Flash Basics & Error Characteristics", (c) 2017, p. 1-22. (Year: 2017).*
International Search Report and Written Opinion for PCT Patent Application No. PCT/US23/36384, Mailed Feb. 23, 2024, 11 pages.

* cited by examiner

*Primary Examiner* — Brian R Peugh
(74) *Attorney, Agent, or Firm* — Morgan, Lewis & Bockius LLP (57) ABSTRACT

The size of page map memory in a NAND flash device used to store page related information is decreased by embedding page type in a row address. The row address is received by the NAND flash device from the host on the data bus in a six-cycle sequence. The received row address is used to decode a physical page address received during the row address cycle to obtain a word line and a block segment number for a block segment in the word line in the NAND flash array. A same block segment number is used for each page type in the block segment.

20 Claims, 9 Drawing Sheets

| Cycle | DQ7 | DQ6 | DQ5 | DQ4 | DQ3 | DQ2 | DQ1 | DQ0 |
|---|---|---|---|---|---|---|---|---|
| First | CA7 | CA6 | CA5 | CA4 | CA3 | CA2 | CA1 | CA0 |
| Second | LOW | CA14 | CA13 | CA12 | CA11 | CA10 | CA9 | CA8 |
| Third | PA7 | PA6 | PA5 | PA4 | PA3 | PA2 | PA1 | PA0 |
| Fourth | PT2 | PT1 | PT0 | PA12 | PA11 | PA10 | PA9 | PA8 |
| Fifth | BA7 | BA6 | BA5 | BA4 | BA3 | BA2 | BA1 | BA0 |
| Sixth | LOW | LOW | LA2 | LA1 | LA0 | BA10 | BA9 | BA8 |

FIG. 4

| Page Type | D7 | D6 | D5 |
|---|---|---|---|
| Lower Page | 0 | 0 | 1 |
| Upper Page | 0 | 1 | 0 |
| Extra Page | 0 | 1 | 1 |
| Top Page | 1 | 0 | 0 |
| Europa Page | 1 | 0 | 1 |
| Static SLC | 1 | 1 | 0 |
| Dynamic SLC | 1 | 1 | 1 |

METHOD AND APPARATUS TO REDUCE MEMORY IN A NAND FLASH DEVICE TO STORE PAGE RELATED INFORMATION

FIELD

This disclosure relates to non-volatile memory devices and in particular to NAND Flash memory devices.

BACKGROUND

Non-volatile memory refers to memory whose state is determinate even if power is interrupted to the device. Storage devices that include non-volatile memory include a secure digital card, a multimedia card, a flash drive (for example, a Universal Serial Bus (USB) flash drive also known as a "USB thumb drive" or "USB memory stick" that includes non-volatile memory with an integrated USB interface), and a solid-state drive.

The non-volatile memory can comprise a block addressable memory device, such as NAND, or more specifically, multi-threshold level NAND Flash memory (for example, Single-Level Cell(s) ("SLC"), Multi-Level Cell(s) ("MLC"), Tri-Level Cell(s) ("TLC"), Quad-Level Cell(s) ("QLC"), Penta-level Cell(s) ("PLC") or some other NAND).

NAND Flash memory devices typically use a one-transistor memory cell that allows for high memory densities, high reliability, and low power consumption. Memory cells are typically arranged in a memory array and are addressable with a row/column format. A NAND Flash cell uses the threshold voltage of a floating-gate transistor to represent the data stored in the cell.

Three Dimensional (3D) NAND is a type of non-volatile flash memory in which memory cells are stacked vertically in multiple layers. For example, 32, 48, 64 or more cell layers can be stacked vertically.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined as set forth in the accompanying claims.

DESCRIPTION OF EMBODIMENTS

A 3D NAND device includes a 3D NAND Flash array that includes a plurality of NAND cells organized in rows and columns. The 3D NAND device does not have dedicated address pins. Addresses (row address and column address) are loaded by a host via the data pins on the 3D NAND device using a six-cycle sequence. The column address is received by the 3D NAND flash on the data pins in the first and second cycles of the six-cycle sequence. The row address is received by the 3D NAND flash during a row address cycle on the data pins in the third, fourth, fifth, and sixth cycles of the six-cycle sequence. The row address includes a page address, a block address, and a Logical Unit (LUN) address.

The host sequentially follows the page number order defined in a page map. The row address is used by the 3D NAND device to decode word line, segment in a block (block segment), word line type, and word line group stored in the page map in Static Random Access Memory (SRAM) in the 3D NAND Flash array. The word line type can be Single-Level Cell(s) ("SLC"), Multi-Level Cell(s) ("MLC"), Tri-Level Cell(s) ("TLC"), Quad-Level Cell(s) ("QLC") or Penta-Level Cell(s) ("PLC") which can be different for native word lines and edge word lines. For example, in a 3D NAND device in which the native word line type is QLC, an edge word line type can be SLC. Each block in the 3D NAND Flash array includes pages. Groups of pages reside in a sub-segment that can be referred to as a block segment. A block segment and word line is used to access a memory location in the 3D NAND Flash array. Word lines are grouped together in a word line group to receive same voltages during operation of the 3D NAND Flash array.

Furthermore, the page types for the array operation are decoded in control circuitry in the 3D NAND device. As the number of layers (also referred to as tiers or word lines) in the 3D NAND flash array increases, the size of the page map in SRAM in the 3D NAND Flash array to store page related information also increases and the control circuitry in the 3D NAND Flash array to decode the page types also increases.

The size of page map SRAM in the 3D NAND flash device used to store page related information is decreased by embedding page type in a row address. The row address is received by the 3D NAND flash device from the host on the data bus in a six-cycle sequence. The received row address and the column address is used to access a 3D NAND Flash array in the 3D NAND flash device.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
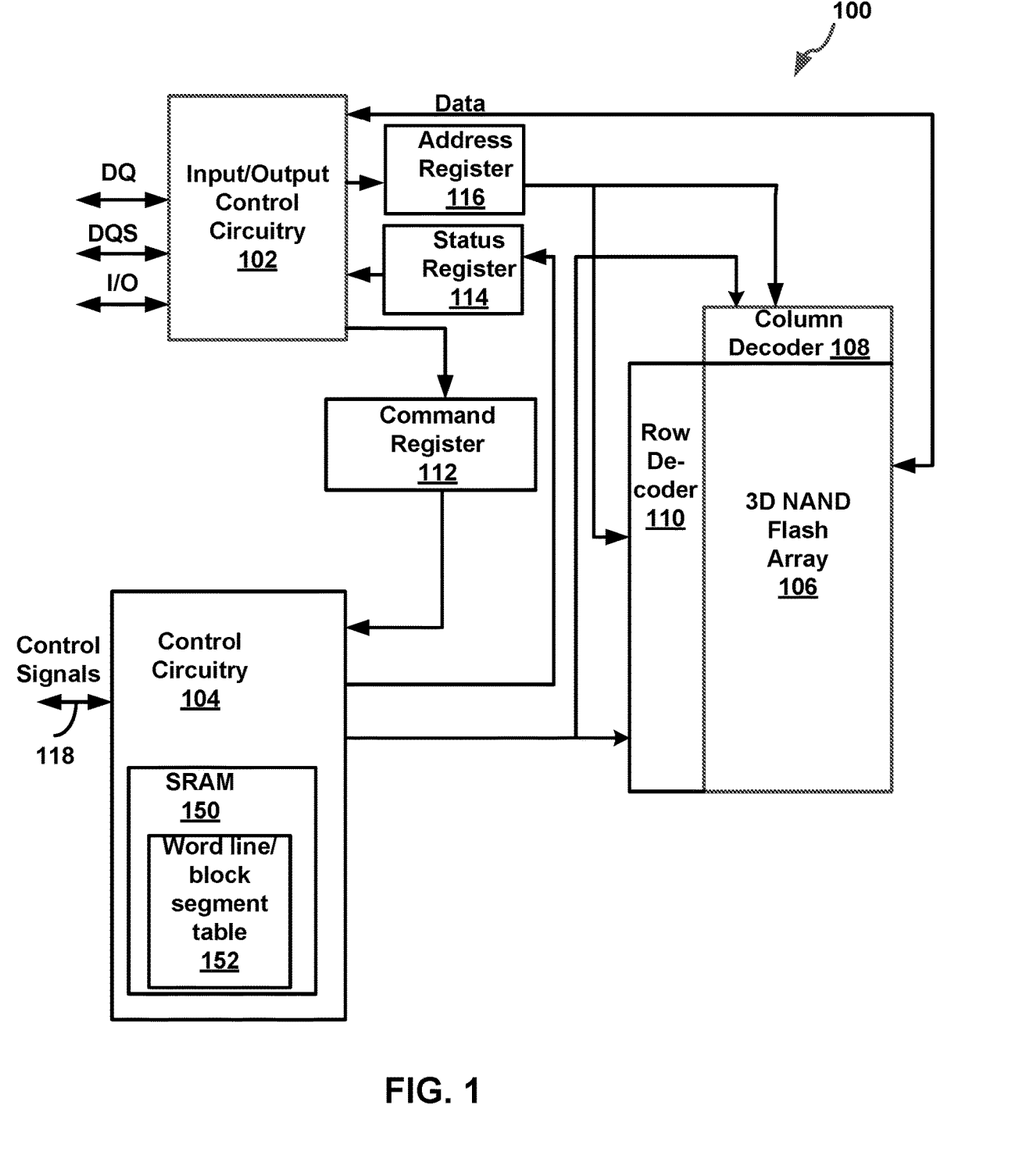
FIG. 1 is a block diagram of a 3D (Three-Dimensional) NAND Flash device.

FIG. 1 is a block diagram of a 3D (Three-Dimensional) NAND device 100. The 3D NAND device 100 includes Input/Output Control circuitry 102 and control circuitry 104 that are coupled to a host memory controller (not shown) via a plurality of control and data signals. The 3D NAND device 100 also includes a 3D NAND Flash array 106 that includes a plurality of NAND cells organized in rows and columns. The 3D NAND device 100 also referred to as a Logical Unit (LUN) can include one or more NAND Flash dies. A NAND flash die is the minimum unit that can independently execute commands and report status.

A row decoder 110 and a column decoder 108 are provided to decode address signals to access the 3D NAND Flash array 106. The 3D NAND device 100 further includes input/output (I/O) control circuitry 102 to manage input of commands, addresses, and data to the 3D NAND device 100 and the output of data and status information from the 3D NAND device 100. An address register 116 is in communication with I/O control circuitry 102, and row decoder 110 and column decoder 108, to latch the address signals prior to decoding. A command register 112 is in communication with I/O control circuitry 102 and control circuitry 104 to latch incoming commands. A status register 114 is in communication with I/O control circuitry 102 and control circuitry 104 to latch status.

Control circuitry 104 controls access to the 3D NAND Flash array 106 in response to the commands and generates status information. Control circuitry 104 is in communication with row decoder 110 and column decoder 108 to control the row decoder 110 and column decoder 108 in response to the addresses. Control circuitry 104 includes a Static Random Access Memory (SRAM) 150 to store page related information for pages in the NAND Flash array 106 in a word line/block segment table 152.

The Open NAND Flash Interface (ONFI) is a standard that defines the operation of the data bus and the control signals 118. The ONFI standard supports an 8-bit or 16-bit data bus (two independent 8-bit data buses) and multiple NAND Flash die in a package (3D NAND device 100).

The Input/Output Control circuitry 102 in the 3D NAND device 100 communicates with the host memory controller via a bidirectional data bus (DQ) and a bidirectional data strobe (DQS) signal. The DQS signal is used to indicate a data valid window. The control circuitry 104 in the 3D NAND device 100 receives control signals 118 from the host memory controller. The control signals 118 that are received include chip enable (CE #) to select the 3D NAND device 100 for data transfer with a host memory controller, Address Latch Enable (ALE) to indicate the type of bus cycle (command, address or data), Command Latch Enable (CLE) to indicate the type of bus cycle (command, address or data), Read Enable (RE #), Write Enable (WE #), and Write Protect (WP #) to disable program and erase operations. The 3D NAND device 100 also includes control signals 118 output by control circuitry 104 that include a Ready/Busy (R/B #) signal to indicate whether the 3D NAND device 100 is executing an operation ("busy") or is ready for a next operation. In a NAND Flash device 100 with multiple LUNs, there is a CE #per LUN to control the LUN.

The NAND flash device 100 does not have dedicated address pins. Addresses are loaded using a six-cycle sequence. The column address is received by the 3D NAND flash on the data pins in the first and second cycles of the six-cycle sequence. The row address is received by the 3D NAND flash on the data pins in the third, fourth, fifth, and sixth cycles.

It will be appreciated that the memory device of FIG. 1 may include additional circuitry and signals, and that the functional blocks of the memory device may not necessarily be segregated as shown in this example case. For example, a single component or component portion of an integrated circuit device could be adapted to perform the functionality of more than one block component of FIG. 1. Alternatively, or in addition, functionality of a single block component of FIG. 1 may be distributed into multiple blocks. Additionally, while specific I/O pins are described in accordance with popular conventions for receipt and output of the various signals, it is noted that other combinations or numbers of I/O pins may be used in the various embodiments. Many variations will be appreciated.

Figure 2:
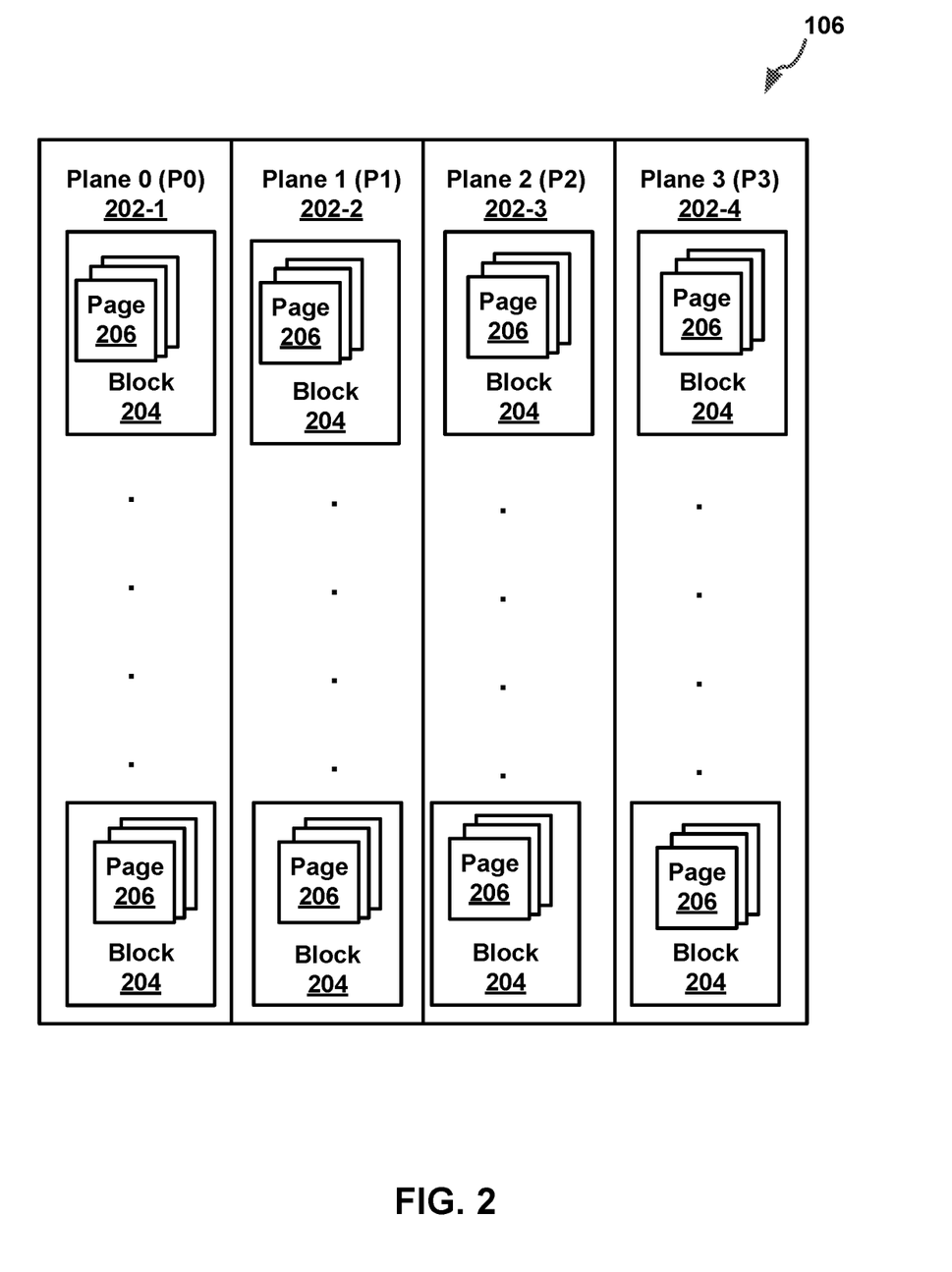
FIG. 2 is a block diagram of an array organization for the 3D NAND Flash array in the 3D (Three-Dimensional) NAND Flash device shown in FIG. 1.

FIG. 2 is a block diagram of an array organization for the 3D NAND Flash array 106 in the 3D (Three-Dimensional) NAND Flash device 100 shown in FIG. 1.

The 3D NAND Flash array 106 is divided into multiple physical planes. In the example shown in FIG. 2, there are four physical planes, plane 0 (P0) 202-1, plane 1 (P1) 202-2, plane 2 (P2) 202-3, and plane 3 (P3) 202-4. Each physical plane 202-1, 202-2, 202-3, 202-4 has respective cache register (not shown) and data register (not shown) independent of the other planes allowing multi-plane operations to perform concurrent Read, Program or Erase operations on multiple planes. Each physical plane 202-1, 202-2, 202-3, 202-4 includes a plurality of blocks 204. Each block 204 is subdivided into a plurality of pages 206.

A block of planar NAND Flash includes a grid of cells connected by word lines (WLs) and bit lines (BLs). A word-line is a set of all cells corresponding to one row across block bit-lines. A page is a set of bits corresponding to the same bit level in word-line. Data is programmed/read from the NAND flash page-by-page. The number of pages per WL in the block is based on the type of memory cell. A single-level cell ("SLC") stores one bit of information per cell in one page (lower page). A multi-level cell ("MLC") stores two bits of information per cell in two pages (lower page, upper page). A Tri-Level Cell ("TLC") stores three bits of information per cell in three pages (lower page, upper page, extra page). A Quad-Level Cell ("QLC") stores four bits of information per cell in four pages (lower page, upper page, extra page, top page). A Penta-Level Cell ("PLC") stores five bits of information per cell in five pages (Lower Page (LP), Upper Page (UP), Extra Page (XP), Top Page (TP), Europa Page (EP)).

Figure 3:
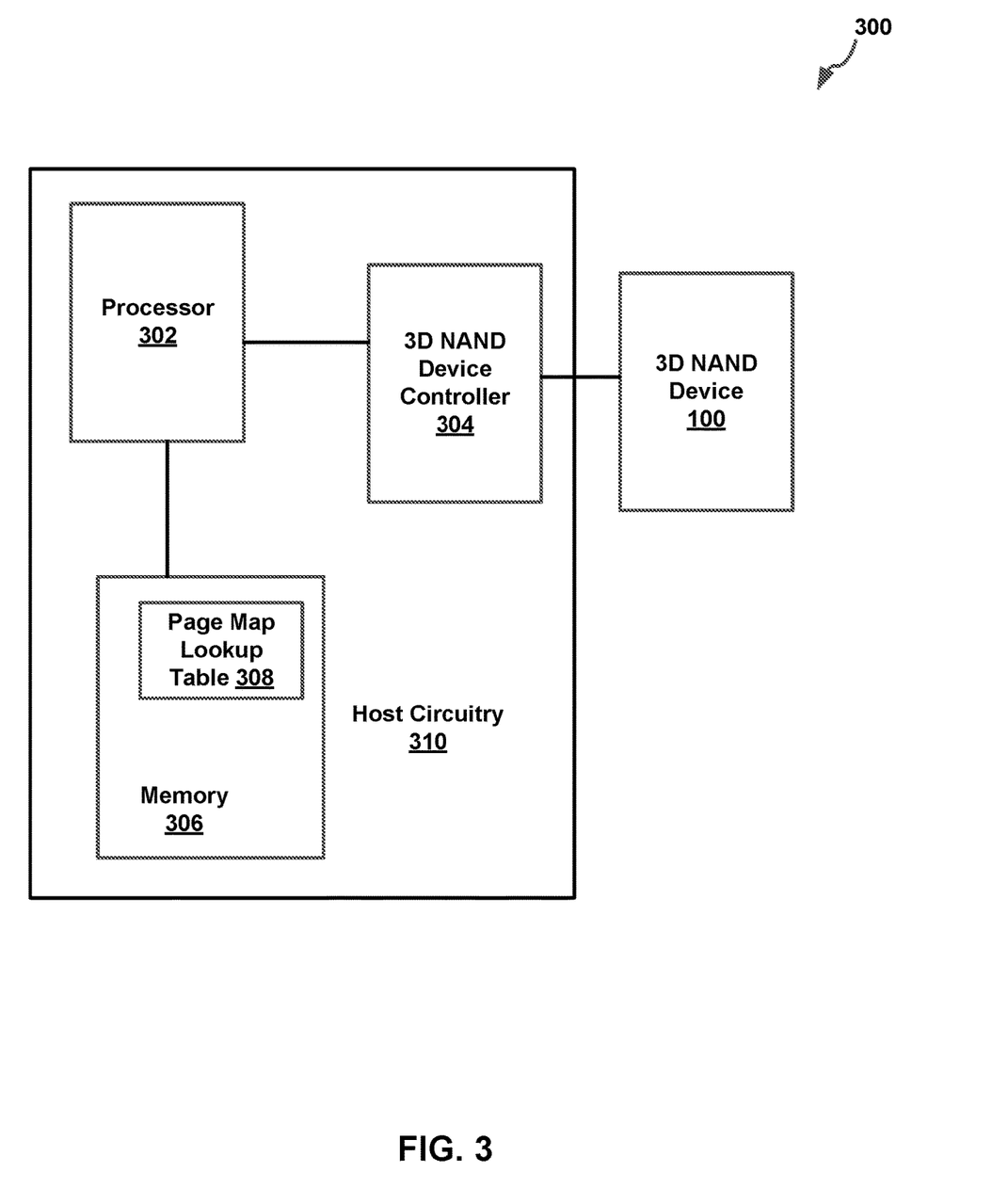
FIG. 3 is a block diagram of a system that includes the 3D NAND Flash device shown in FIG. 1.

FIG. 3 is a block diagram of a system 300 that includes the 3D NAND Flash device 100 shown in FIG. 1. The system 300 includes host circuitry 310 and the 3D NAND Flash device 100. The host circuitry 310 includes a processor 302, a 3D NAND device controller 304 and memory 306. The 3D NAND device controller 304 is configured by the processor 302 to send commands to the 3D NAND device 100. The memory 306 stores a page map lookup table 308 used by the processor 302 to send commands to the 3D NAND device 100.

Figure 4:
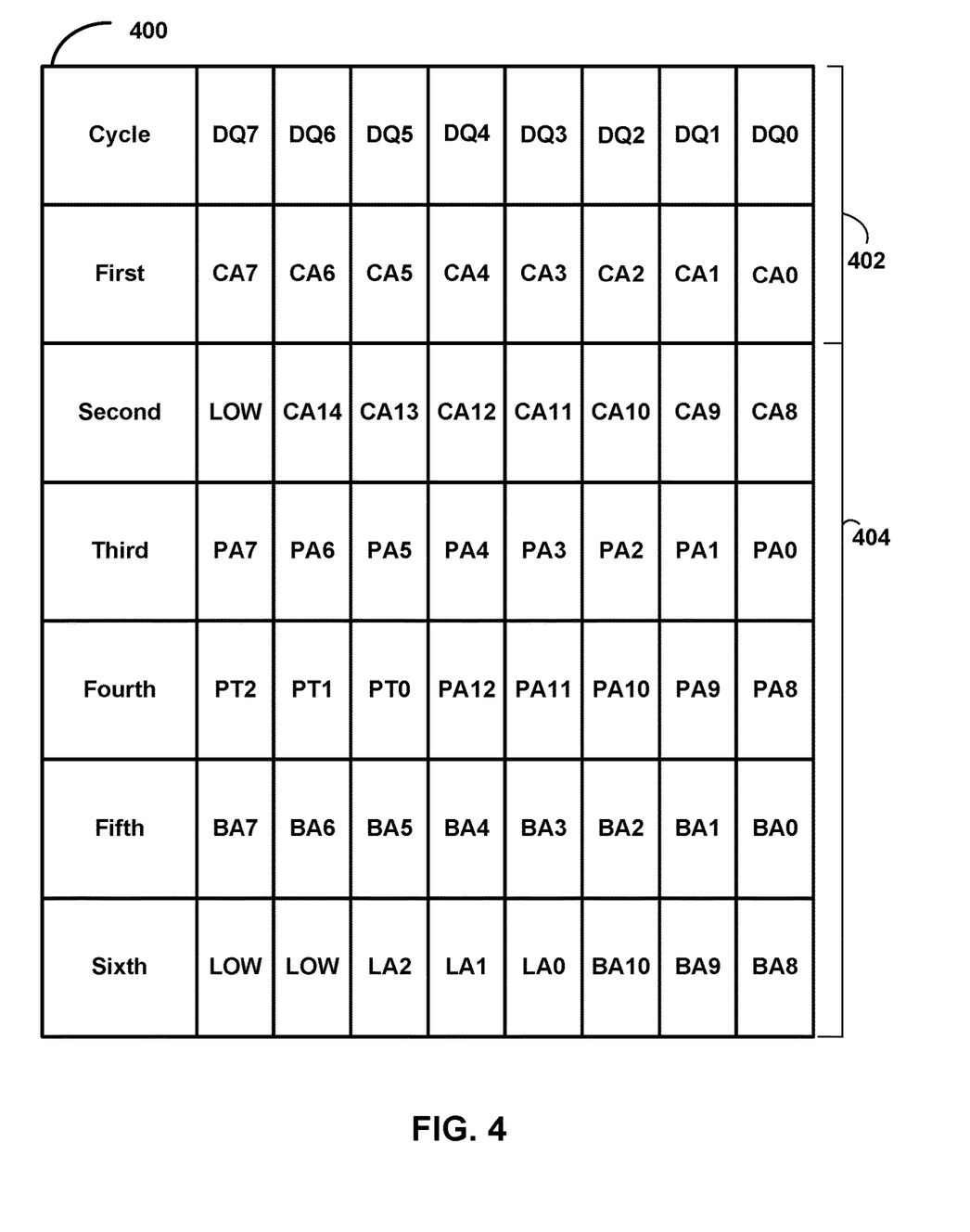
FIG. 4 illustrates a six-cycle sequence used by the host to load addresses for the 3D NAND Flash array.

FIG. 4 illustrates a six-cycle sequence 400 used by the host circuitry 310 to load addresses for the 3D NAND Flash array 106. The addresses include column address 402 and row address 404. The six-cycle sequence will be described in conjunction with the 3D (Three-Dimensional) NAND Flash device shown in FIG. 1. The column address 402 is received by the 3D NAND flash array 106 on the data pins DQ (DQ7:DQ0) in the first and second cycles of the six-cycle sequence. Column address bits CA7:CA0 are received by the 3D NAND flash array 106 on the data pins DQ (DQ7:DQ0) in the first cycle. Column address bits CA14: CA8 are received by the 3D NAND flash on the data pins DQ (DQ6:DQ0) in the second cycle.

The row address 404 is received by the 3D NAND flash on the data pins (DQ7:DQ0) in the third, fourth, fifth, and sixth cycles. The row address includes a physical page address (PA), a page type, a block address (BA), and a LUN address (LA). The block address (BA) includes a plane address (for example, BA[2:0]) and a block address per plane (for example, BA[10:3]).

Eight physical page address bits (PA7:PA0) are received as part of the row address cycle by the 3D NAND flash array 106 on the data pins DQ (DQ7:DQ0) in the third cycle.

Five physical page address bits (PA12:PA8) and 3 Page Type bits (Page Type 2:Page Type 0) are received by the 3D NAND flash array 106 on the data pins DQ (DQ7:DQ0) in the fourth cycle. The word line number, block segment number, word line type, block type and word line group number for each page type in a single row and block segment is the same.

Eight block address bits (BA7:BA0) including a three bit plane address (BA[2:0]) and five bits of an 8-bit block address per plane (BA[7:3]) are received by the 3D NAND flash array 106 on the data pins DQ (DQ7:DQ0) in the fifth cycle.

Three bits of an 8-bit block address per plane (BA[10:8]) and a three bit LUN address (LA2-LA0) are received by the 3D NAND flash array 106 on the data pins DQ (DQ5:DQ0) in the sixth cycle.

Figure 5:
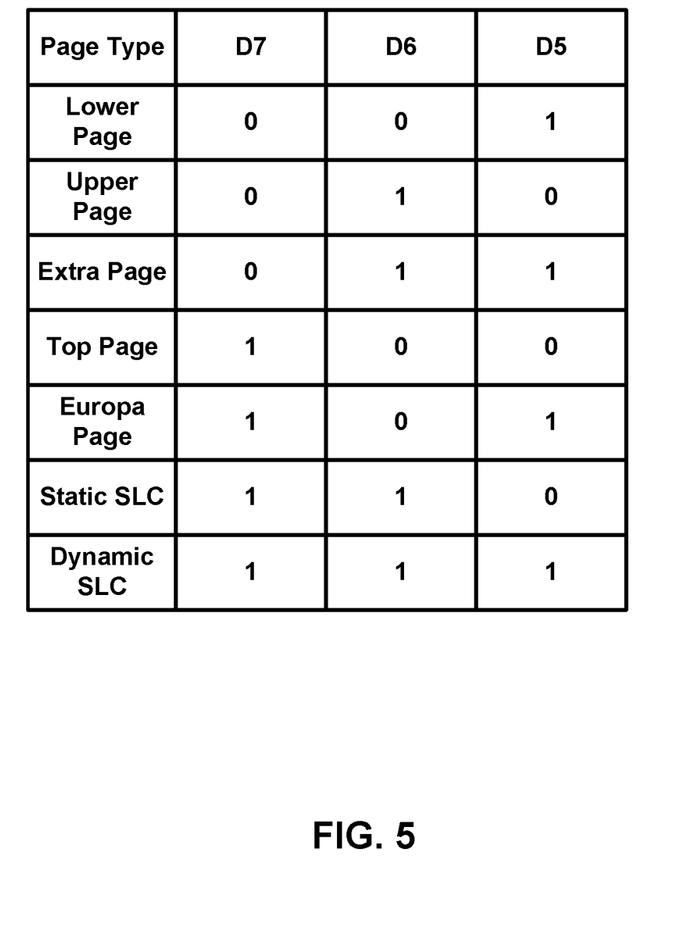
FIG. 5 is a table illustrating the mapping of page type bits sent on data pins DQ (DQ7:DQ5) in the fourth cycle to a page type in the 3D NAND device.

FIG. 5 is a table illustrating the mapping of page type bits sent on data pins DQ (DQ7:DQ5) in the fourth cycle to a page type in the 3D NAND device 100. In the embodiment shown in FIG. 5, seven page types are encoded in three bits as an encoded page type.

Page type bits '001' (binary) are mapped to the lower page (LP), page type bits '001' (binary) are mapped to the Lower Page (LP). Page type bits '010' (binary) are mapped to the Upper Page (UP). Page type bits '011' (binary) are mapped to the Extra Page (XP). Page type bits '100' (binary) are mapped to the Top Page (TP). Page type bits '101' (binary) are mapped to the Europa Page (EP).

Page type bits '110' (binary) are mapped to a static Single Level Cell (sSLC), and page type bits '111' (binary) are mapped to a dynamic Single Level Cell (dSLC). A word line type in native mode (for example, QLC) for a block type in native mode can be converted to sSLC mode for the life of the 3D NAND device 100 or to dSLC mode for a period of time and converted back to native mode after the operation in dSLC mode is completed.

Figure 6:
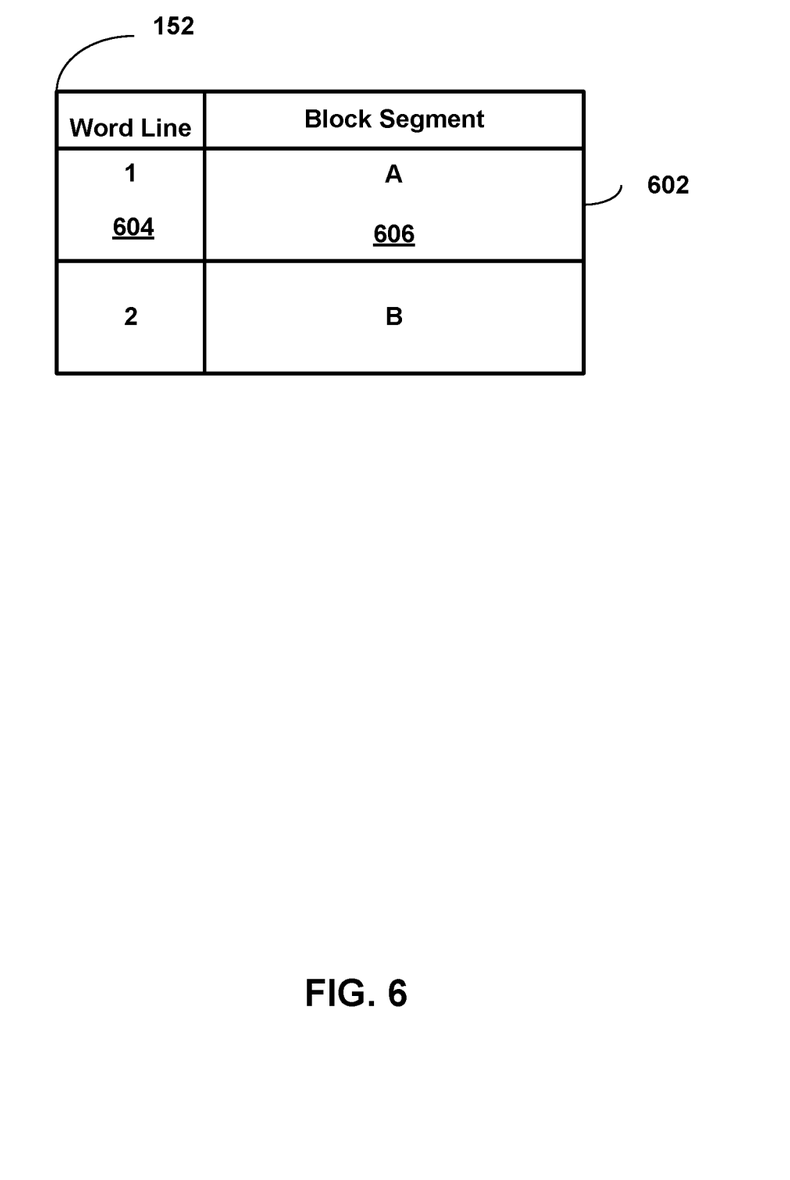
FIG. 6 is an example of the word line/block segment table 152 shown in FIG. 1.

FIG. 6 is an example of the word line/block segment table 152 shown in FIG. 1. The word line/block segment table 150 has one entry 602 per word line in the 3D NAND device. A same block segment number used for each page type in the block segment. A single entry 602 per word line is used for pages and block segments in the word line. Each entry 602 includes a word line number field 604 and at least one block segment field 606. The number of block segment fields 606 per entry 602 is dependent on the number of block segments per word line in a block. The word line number field 604 stores the word line number (for example, '1') and the block segment field 606 stores the block segment number (for example, 'A', 'B'). There is a unique block segment number assigned to every block segment in the 3D NAND Flash array 106.

Figure 7:
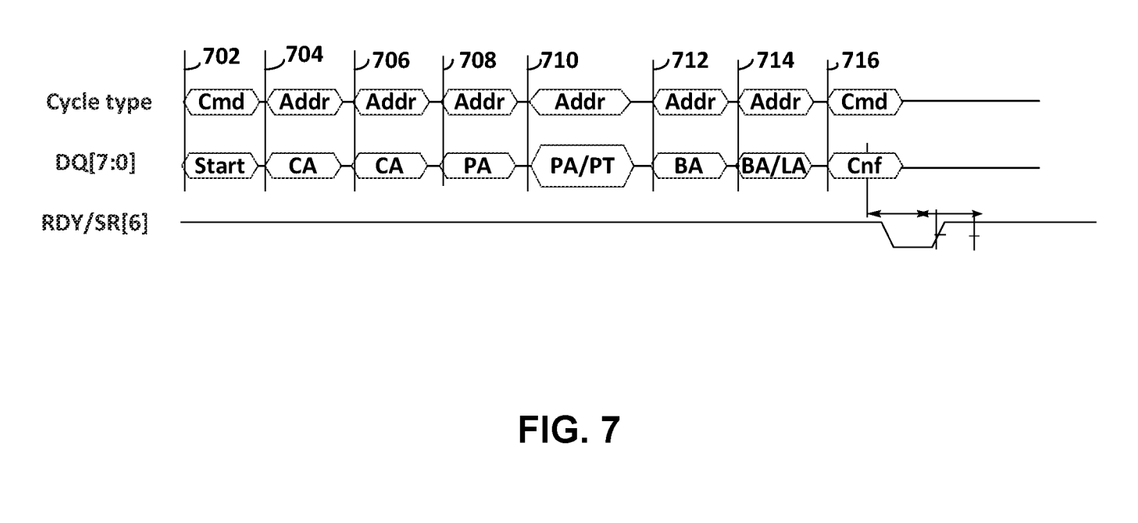
FIG. 7 is a timing diagram illustrating the six-cycle sequence used by the host to load addresses in the 3D NAND Flash array.

FIG. 7 is a timing diagram illustrating the six-cycle sequence used by the host circuitry 310 to load addresses in the 3D NAND Flash array 106.

At time 702, a start command is sent by the host circuitry 310 on the data pins DQ (DQ7:DQ0).

At time 704, column address bits CA7:CA0 sent by the host circuitry 310 on the data pins DQ (DQ7:DQ0) to the 3D NAND flash array 106.

At time 706, column address bits CA14:CA8 are sent by the host circuitry 310 on the data pins DQ (DQ7:DQ0) to the 3D NAND flash array 106.

At time 708, eight physical page address bits (PA7:PA0) are sent by the host circuitry 310 on the data pins DQ (DQ7:DQ0) to the 3D NAND flash array 106.

At time 710, five physical page address bits (PA12:PA8) and 3 Page Type bits (Page Type 2:Page Type 0) are sent by the host circuitry 310 on the data pins DQ (DQ7:DQ0) to the 3D NAND flash array 106.

At time 712, eight block address bits (BA7:BA0) including a three bit plane address (BA[2:0]) and five bits of an 8-bit block address per plane (BA[7:3]) are sent by the host circuitry 310 on the data pins DQ (DQ7:DQ0) to the 3D NAND flash array 106.

At time 714, three bits of an 8-bit block address per plane (BA[10:8]) and a three bit LUN address (LA2-LA0) are sent by the host circuitry 310 on the data pins DQ (DQ7:DQ0) to the 3D NAND flash array 106.

At time 716, a confirm command is sent by the host circuitry 310 on the data pins DQ (DQ7:DQ0).

Figure 8:
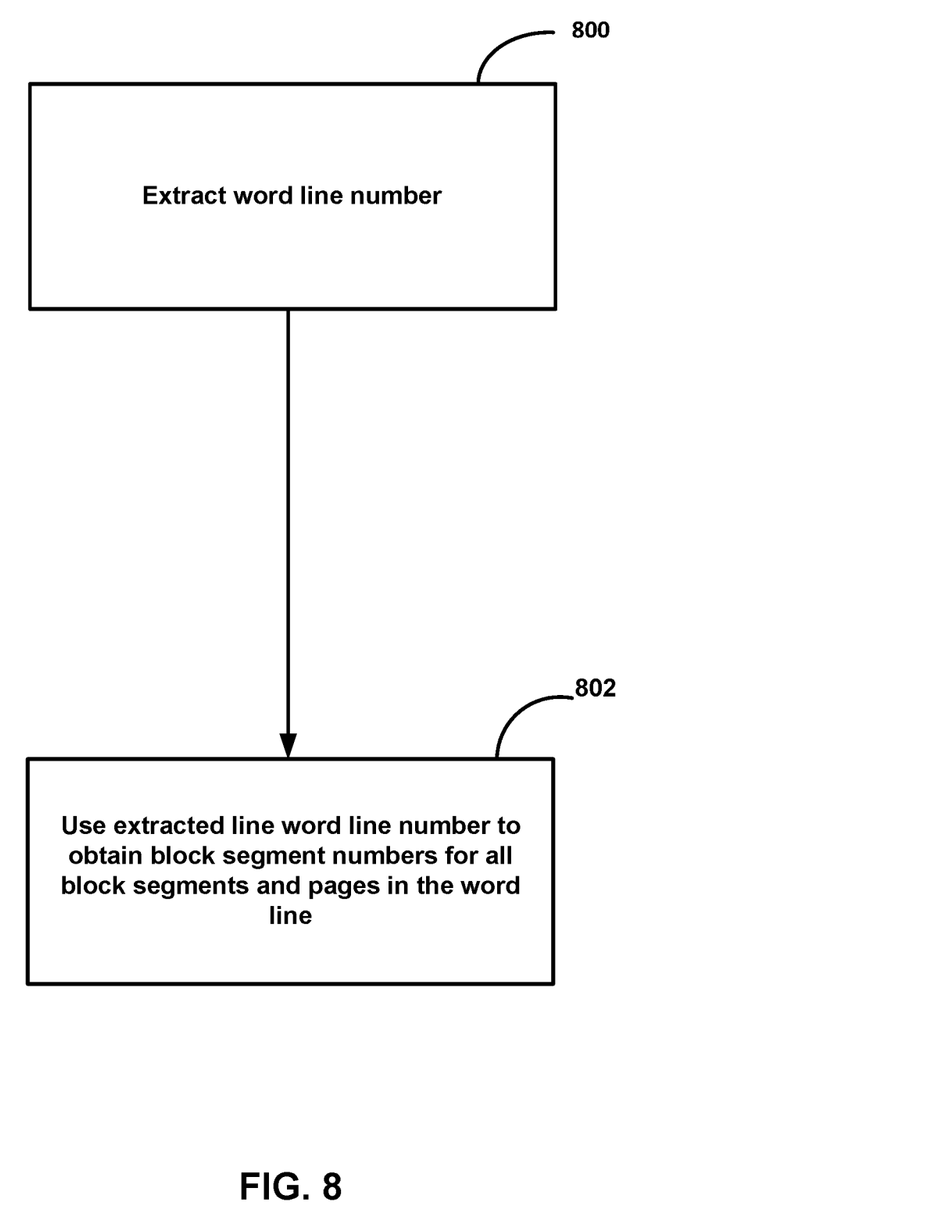
FIG. 8 is a flowgraph of a method to load addresses for the 3D NAND Flash array.

FIG. 8 is a flowgraph of a method to decode physical page addresses for the 3D NAND Flash array 106.

At block 800, the word line number for the physical page addresses received in the six-cycle sequence is extracted from the physical page address. The eight physical page address bits (PA7:PA0) received by the 3D NAND flash array 106 on the data pins DQ (DQ7:DQ0) in the third cycle and the five physical page address bits (PA12:PA8) received by the 3D NAND flash array 106 on the data pins DQ (DQ7:DQ0) in the fourth cycle provide the word line number for the page.

At block 802, the extracted word line number is used to read the block segment field 606 in the entry 602 for the word line number in the word line/block segment table 152. The block segment field 606 stores a block segment number for the physical page address received in the six-cycle sequence. The block segment number is the remainder of physical page address % number of block segments.

Figure 9:
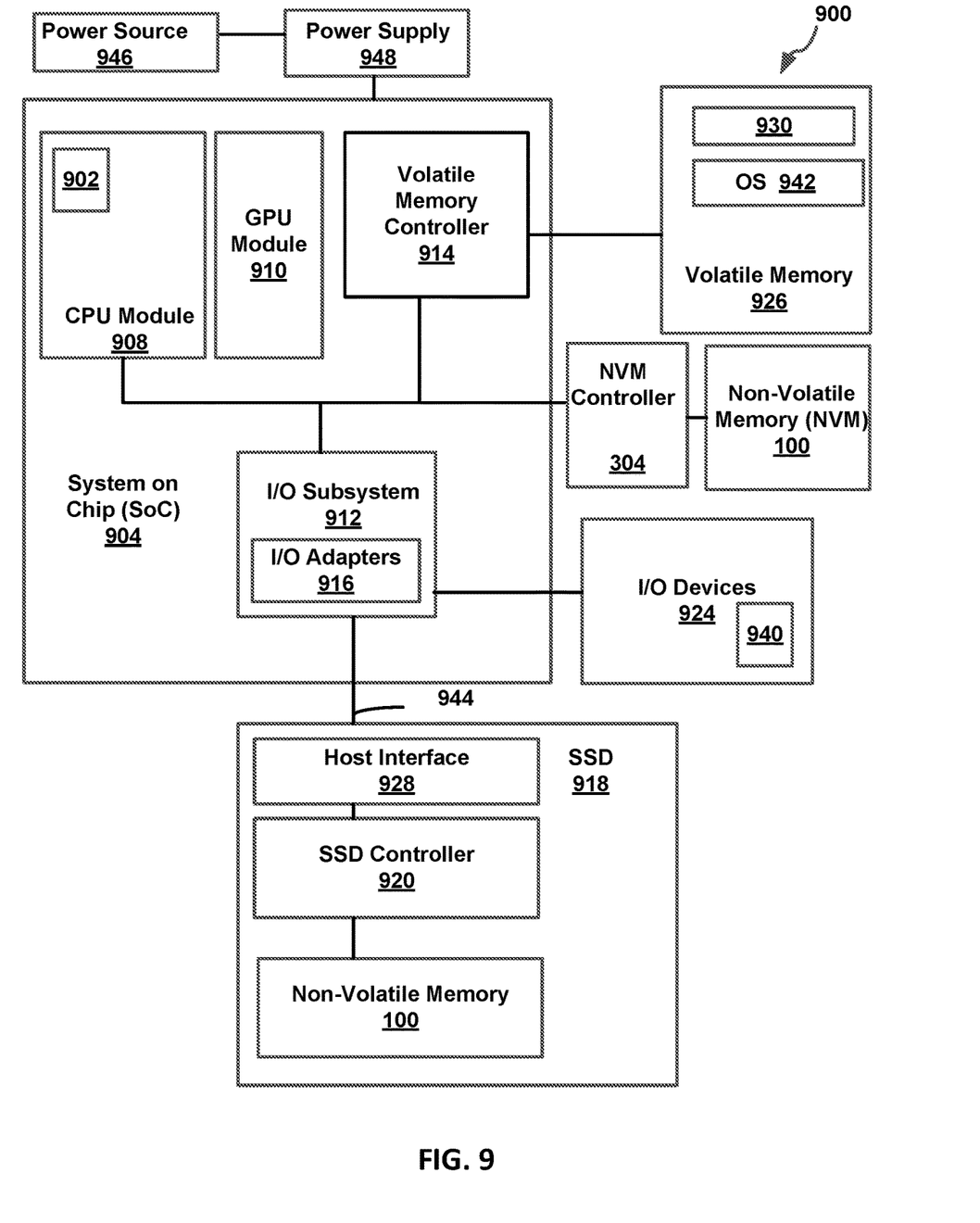
FIG. 9 is a block diagram of a computer system that includes the 3D NAND device.

FIG. 9 is a block diagram of a computer system 900 that includes the 3D NAND device 100. Computer system 900 can correspond to a computing device including, but not limited to, a server, a workstation computer, a desktop computer, a laptop computer, and/or a tablet computer.

The computer system 900 includes a system on chip (SOC or SoC) 904 which combines processor, graphics, memory, and Input/Output (I/O) control logic into one SoC package. The SoC 904 includes at least one Central Processing Unit (CPU) module 908, a volatile memory controller 914, and a Graphics Processor Unit (GPU) 910. In other embodiments, the volatile memory controller 914 can be external to the SoC 904. Although not shown, each of the processor core(s) 902 can internally include one or more instruction/data caches, execution units, prefetch buffers, instruction queues, branch address calculation units, instruction decoders, floating point units, retirement units, etc. The CPU module 908 can correspond to a single core or a multi-core general purpose processor, such as those provided by Intel® Corporation, according to one embodiment.

The Graphics Processor Unit (GPU) 910 can include one or more GPU cores and a GPU cache which can store graphics related data for the GPU core. The GPU core can internally include one or more execution units and one or more instruction and data caches. Additionally, the Graphics Processor Unit (GPU) 910 can contain other graphics logic units that are not shown in FIG. 9, such as one or more vertex processing units, rasterization units, media processing units, and codecs.

Within the I/O subsystem 912, one or more I/O adapter(s) 916 are present to translate a host communication protocol utilized within the processor core(s) 902 to a protocol compatible with particular I/O devices. Some of the protocols that adapters can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 916 can communicate with external I/O devices 924 which can include, for example, user interface device(s) including a display and/or a touch-screen display 940, printer, keypad, keyboard, communication logic, wired and/or wireless, storage device(s) including hard disk drives ("HDD"), solid-state drives ("SSD") 918, removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (Non-Volatile Memory Express) over PCIe (Peripheral Component Interconnect Express), and SATA (Serial ATA (Advanced Technology Attachment))

Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

The I/O adapter(s) 916 can also communicate with a storage device, that can be a hard disk drive (HDD) or a solid-state drive ("SSD") 918 which includes a SSD controller 920, a host interface 928 and a 3D NAND device 100.

The computer system 900 can include a 3D NAND device 100 and a 3D NAND device controller 304 communicatively coupled to the CPU module 908 in the SoC 904. The 3D NAND device 100 can be included in a dual in-line memory module (DIMM) that can be referred to as a non-volatile dual in-line memory module (NVDIMM).

A non-volatile memory (NVM) device is a memory whose state is determinate even if power is interrupted to the device. In one embodiment, the NVM device can comprise a block addressable memory device, such as NAND technologies, or more specifically, multi-threshold level NAND Flash memory (for example, Single-Level Cell ("SLC"), Multi-Level Cell ("MLC"), Quad-Level Cell ("QLC"), Tri-Level Cell ("TLC"), or some other NAND).

The I/O adapters 916 can include a Peripheral Component Interconnect Express (PCIe) adapter that is communicatively coupled using the NVMe (NVM Express) over PCIe (Peripheral Component Interconnect Express) protocol over bus 944 to a host interface 928 in the solid state drive 918. Non-Volatile Memory Express (NVMe) standards define a register level interface for host software to communicate with a non-volatile memory subsystem (for example, a Solid-state Drive (SSD)) over Peripheral Component Interconnect Express (PCIe), a high-speed serial computer expansion bus). The NVM Express standards are available at www.nvmexpress.org. The PCIe standards are available at www.pcisig.com.

Applications 930 and an operating system (OS) 942 can be stored in volatile memory 926. Volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4 (LPDDR version 4, JESD209-4, originally published by JEDEC in August 2014), WIO2 (Wide Input/Output version 2, JESD229-2 originally published by JEDEC in August 2014), HBM (High Bandwidth Memory, JESD325, originally published by JEDEC in October 2013), DDR5 (DDR version 5, currently in discussion by JEDEC), LPDDR5 (currently in discussion by JEDEC), HBM2 (HBM version 2, currently in discussion by JEDEC), or others or combinations of memory technologies, and technologies based on derivatives or extensions of such specifications. The JEDEC standards are available at www.jedec.org.

An operating system 942 is software that manages computer hardware and software including memory allocation and access to I/O devices. Examples of operating systems include Microsoft® Windows®, Linux®, iOS® and Android®.

Power source 946 provides power to the components of computer system 900. More specifically, power source 946 typically interfaces to one or multiple power supplies 948 in computer system 900 to provide power to the components of system X00. In one example, power supply 948 includes an AC to DC (alternating current to direct current) adapter to plug into a wall outlet. Such AC power can be renewable energy (for example, solar power) power source 946. In one example, power source 946 includes a DC power source, such as an external AC to DC converter. In one example, power source 946 or power supply 948 includes wireless charging hardware to charge via proximity to a charging field. In one example, power source 946 can include an internal battery or fuel cell source.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. A non-volatile memory device comprising:
   a NAND flash array comprising a plurality of NAND cells arranged in blocks comprising block segments, a given block segment comprising one or more page types; and
   control circuitry, the control circuitry to decode a physical page address received during a row address cycle to obtain a word line and a block segment number for a block segment in the word line in the NAND flash array comprising multiple page types, a same block segment number used for each page type in the block segment.

2. The non-volatile memory device of claim 1, wherein the word line and the block segment number are stored in a table in a Static Random Access memory.

3. The non-volatile memory device of claim 2, wherein each block segment has an entry in the table.

4. The non-volatile memory device of claim 1, wherein the physical page address is received as part of the row address cycle that includes an encoded page type.

5. The non-volatile memory device of claim 4, wherein the encoded page type is encoded in three bits.

6. The non-volatile memory device of claim 4, wherein the encoded page type is a static Single Level Cell.

7. The non-volatile memory device of claim 4, wherein the encoded page type is a dynamic Single Level Cell.

8. The non-volatile memory device of claim 4, wherein the NAND cells are Quad-Level Cells and the encoded page type is Lower Page, Upper Page, Extra Page or Top Page.

9. The non-volatile memory device of claim 4, wherein the NAND cells are Penta-Level Cells and the encoded page type is Lower Page, Upper Page, Extra Page, Top Page or Europa Page.

10. The non-volatile memory device of claim 1, wherein the NAND cells are three Dimensional (3D) NAND cells.

11. A system comprising:
    a memory controller; and
    a non-volatile memory device, the non-volatile memory device comprising a NAND flash array comprising a plurality of NAND cells arranged in blocks comprising block segments, a given block segment comprising one or more page types; and
    control circuitry, the control circuitry to decode a physical page address received during a row address cycle to obtain a word line and a block segment number for a block segment in the word line in the NAND flash array comprising multiple page types, a same block segment number used for each page type in the block segment.

12. The system of claim 11, wherein the word line and the block segment number are stored in a table in a Static Random Access Memory.

13. The system of claim 12, wherein each block segment has an entry in the table.

14. The system of claim 11, wherein the physical page address is received as part of the row address cycle that includes an encoded page type.

15. The system of claim 14, wherein the encoded page type is encoded in three bits.

16. The system of claim 14, wherein the encoded page type is a static Single Level Cell.

17. The system of claim 14, wherein the encoded page type is a dynamic Single Level Cell.

18. The system of claim 14, wherein the NAND cells are Penta-level Cells and the encoded page type is Lower Page, Upper Page, Extra Page, Top Page or Europa Page.

19. The system of claim 11, wherein the NAND cells are three Dimensional (3D) NAND cells.

20. The system of claim 11, further comprising:
    one or more of:
    a processor,
    a power supply, and
    a display coupled with the non-volatile memory device.

* * * * *